(12) United States Patent
Kim (10) Patent No.: US 9,341,267 B2
(45) Date of Patent: May 17, 2016

(54) CYLINDER FORMED WITH UNEVEN PATTERN ON SURFACE OF INNER WALL

(75) Inventor: Sung Gi Kim, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 425 days.

(21) Appl. No.: 13/883,470

(22) PCT Filed: Nov. 3, 2010

(86) PCT No.: PCT/KR2010/007690
§ 371 (c)(1),
(2), (4) Date: May 3, 2013

(87) PCT Pub. No.: WO2012/060487
PCT Pub. Date: May 10, 2012

(65) Prior Publication Data
US 2013/0220113 A1    Aug. 29, 2013

(51) Int. Cl.
*F16J 10/04*    (2006.01)
*F02F 1/20*    (2006.01)
*F16J 1/08*    (2006.01)

(52) U.S. Cl.
CPC . *F16J 10/04* (2013.01); *F02F 1/20* (2013.01); *F16J 1/08* (2013.01)

(58) Field of Classification Search
CPC .................................... F16J 1/08; F16J 10/04
USPC ................................................ 92/169.1, 153
See application file for complete search history.

(56) References Cited

U.S. PATENT DOCUMENTS

| | | | | |
|---|---|---|---|---|
| 1,955,292 A * | 4/1934 | Heintz | ...................... | 29/888.061 |
| 2,085,976 A * | 7/1937 | Heintz | ............................ | 92/153 |
| 2,809,873 A * | 10/1957 | Cavileer | .......................... | 92/153 |
| 3,063,763 A * | 11/1962 | Zubrisky | ......................... | 384/13 |
| 3,657,078 A * | 4/1972 | Schweikher | ................... | 205/131 |
| 4,683,809 A * | 8/1987 | Taylor | ............................ | 92/208 |
| 5,516,213 A * | 5/1996 | Moriyama et al. | ............ | 384/292 |
| 6,095,690 A * | 8/2000 | Niegel et al. | .................. | 384/293 |
| 6,253,724 B1 | 7/2001 | Han | | |
| 7,104,240 B1 * | 9/2006 | Vuk et al. | ................... | 123/193.2 |
| 7,267,045 B2 * | 9/2007 | Leweux et al. | ................. | 92/159 |
| 8,381,696 B2 * | 2/2013 | Urabe et al. | ............... | 123/193.2 |

(Continued)

FOREIGN PATENT DOCUMENTS

| | | |
|---|---|---|
| CN | 1076992 A | 10/1993 |
| CN | 2316470 Y | 4/1999 |

(Continued)

OTHER PUBLICATIONS

Chinese Office Action dated Oct. 9, 2014 for corresponding Chinese Application No. 201080069964.1.

(Continued)

*Primary Examiner* — Thomas E Lazo
(74) *Attorney, Agent, or Firm* — John D. Veldhuis-Kroeze; Westman, Champlin & Koehler, P.A.

(57) ABSTRACT

The present disclosure relates to a cylinder having an inner wall formed with fine uneven patterns to improve durability. The fine uneven patterns according to the present disclosure increases oil film pressure between a piston ring and an inner wall of the cylinder, and smoothly supplies engine oil to where the engine oil is insufficient, thereby reducing abrasion between the piston ring and the inner wall of the cylinder.

9 Claims, 11 Drawing Sheets

(56) References Cited

U.S. PATENT DOCUMENTS

| | | |
|---|---|---|
| 2003/0021711 A1 | 1/2003 | Klink et al. |
| 2007/0012178 A1* | 1/2007 | Takami et al. ............... 92/171.1 |
| 2007/0101967 A1* | 5/2007 | Pegg ........................ 123/196 M |

FOREIGN PATENT DOCUMENTS

| | | |
|---|---|---|
| CN | 201554563 U | 8/2010 |
| DE | 102006060920 A1 | 7/2008 |
| KR | 10-2009-0038829 A | 4/2009 |
| WO | 98-53192 A1 | 11/1998 |
| WO | WO 9853192 A1 * | 11/1998 |
| WO | 00-40850 A1 | 7/2000 |
| WO | WO 2009044824 A1 * | 4/2009 |

OTHER PUBLICATIONS

Search Report dated Jul. 12, 2011 and written in Korean with English translation attached for International Application No. PCT/KR2010/007690 filed Nov. 3, 2010, 4 pages.

* cited by examiner

FINE HOLE-TYPE UNEVEN PATTERN

CYLINDER FORMED WITH UNEVEN PATTERN ON SURFACE OF INNER WALL

CROSS-REFERENCE TO RELATED APPLICATION

This application is a Section 371 National Stage Application of International Application No. PCT/KR2010/007690, filed Nov. 3, 2010 and published, not in English, as WO2012/060487 on May 10, 2012.

FIELD OF THE DISCLOSURE

The present disclosure relates to a cylinder of an internal combustion engine, and to a cylinder having an inner wall of which a wall surface is formed with an uneven pattern. That is, an aspect of the present disclosure relates to a technology of reducing friction and abrasion by forming a fine uneven pattern on at least one surface of two surfaces which are relatively moved using lubricant.

BACKGROUND OF THE DISCLOSURE

An internal combustion engine includes a piston which is moved by receiving explosive power from fuel combustion, and a cylinder which guides the movement of the piston. The cylinder is also called a gas column, and in a gasoline engine or a diesel engine, the piston is moved by explosive power generated by injecting fuel with air into the cylinder, and igniting and exploding fuel.

An inside or an inner wall of the cylinder is called a bore, and a wall surface of an inner wall of the cylinder is called a bore surface.

The piston unceasingly produces friction with the inner wall of the cylinder while being moved in the inside (bore) of the cylinder. Particularly, a piston ring is provided on a circumference of an upper portion of the piston to enhance close contact between the piston and the inner wall of the cylinder, and to prevent air or exploding fuel gas from leaking. The friction between the piston ring and the inner wall of the cylinder is particularly serious.

In general, the piston ring and the inner wall of the cylinder are relatively moved in parallel with each other by using lubricant that is called engine oil. Here, the engine oil forms a lubricative film between the piston ring and the inner wall of the cylinder and serves to reduce friction between the piston ring and the inner wall of the cylinder.

In general, it is a widely known fact from a theory of fluid lubrication that in a case in which two surfaces are in parallel like the inner wall of the cylinder and the piston, fluid dynamic pressure is not generated in lubricant even though the two surfaces are relatively moved by using liquid lubricant.

As such, the parallel relative movement of the cylinder and the piston is a movement that is difficult to form a lubricative film, and the cylinder and the piston are operated in a state in which the engine oil between the piston (or the piston ring) and the inner wall of the cylinder is always insufficient due to high combustion pressure and high combustion heat in the cylinder. For this reason, serious friction and abrasion occur between the piston ring and the inner wall of the cylinder. In a case in which the cylinder and the piston are operated under this driving condition for a long period of time, fuel consumption or engine oil consumption is increased, and of course, this may cause replacement of the engine in some cases.

In order to reduce the abrasion of the inner wall of the cylinder, which produces friction with the piston ring, a method of heat treatment, improving surface roughness, honing, or the like has been developed in the related art. However, as an operational environment of the engine is varied in a direction in which the piston ring is weakened against abrasion, a method of more efficiently reducing abrasion of the piston ring compared to the existing method is required.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Accordingly, an aspect of the present inventors have found out that when a plurality of fine uneven patterns is processed on at least one surface of two surfaces which are relatively moved, fluid dynamic pressure is generated between the two surfaces even though the two surfaces are relatively moved in parallel with each other, thereby improving lubricity, and have completed the present disclosure.

An aspect of the present disclosure is provided to reduce abrasion of a cylinder 10 and a piston ring by forming uneven patterns 40 and 50 on an inner wall 11 of the cylinder 10 of an internal combustion engine.

In an aspect of the present disclosure, uneven patterns are formed on an inner wall surface of the cylinder, and the uneven pattern collects lubricant such as engine oil, and as a result, abrasion occurring at a boundary surface is reduced as the lubricant improves a lubrication state between the inner wall of the cylinder and a piston or a piston ring. That is, the present disclosure provides a cylinder having an inner wall on which fine uneven patterns are formed.

The fine uneven patterns according to the present disclosure may more efficiently reduce abrasion of the cylinder and the piston ring compared to a method of heat treatment, improving surface roughness, honing, or the like in the related art.

In an aspect of the present disclosure, a position where an effect of reducing abrasion particularly in the cylinder may be maximized is found out, and the fine uneven patterns are formed on that position, thereby efficiently reducing abrasion of the cylinder and the piston or the piston ring.

In addition, an aspect of the present disclosure provides a method of reducing cost for manufacturing the cylinder and shortening a time period for manufacturing the cylinder by forming the fine uneven patterns at an optimum position only as necessary.

An aspect of the present disclosure provides a cylinder in which fine uneven patterns are formed in at least a part of a region of a stroke length L section that is a section between a top dead center (TDC) and a bottom dead center (BDC).

Figure 1:
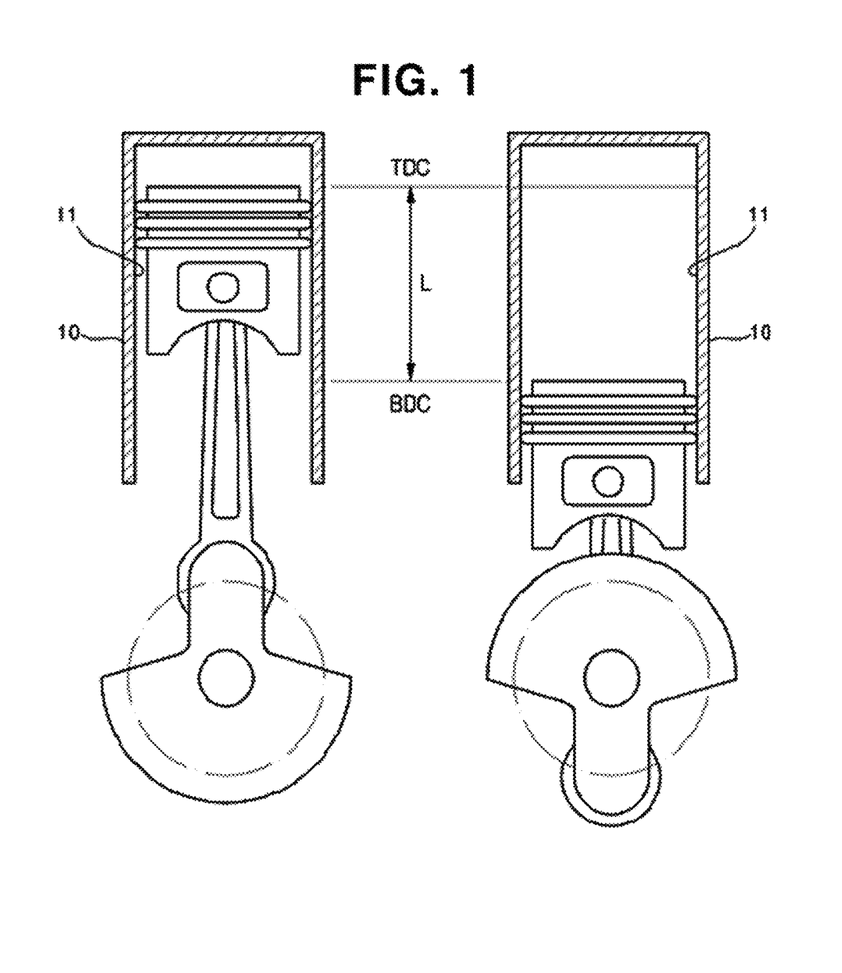
FIG. 1 is a view illustrating a general cylinder, in which a top dead center (TDC) and a bottom dead center (BDC) are illustrated.
Figure 2A:
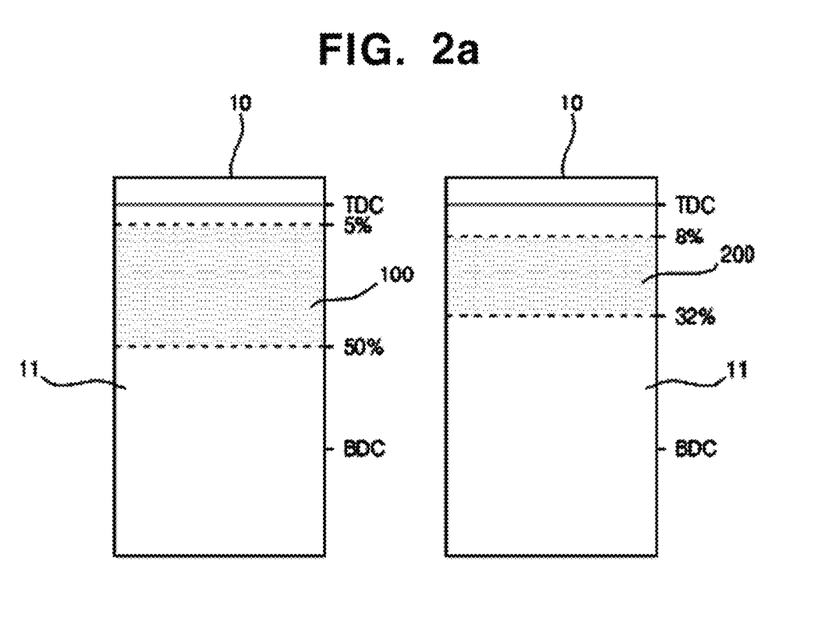
FIG. 2a is a view for explaining a position where fine uneven patterns are formed on an inner wall of the cylinder, of which the left side indicates a first region 100 that is a region which is 5 to 50% of a length of a cylinder stroke length from the top dead center (TDC), and the right side indicates a second region 200 that is a region that is 8 to 32% of a length of the cylinder stroke length from the top dead center (TDC).
Figure 2B:
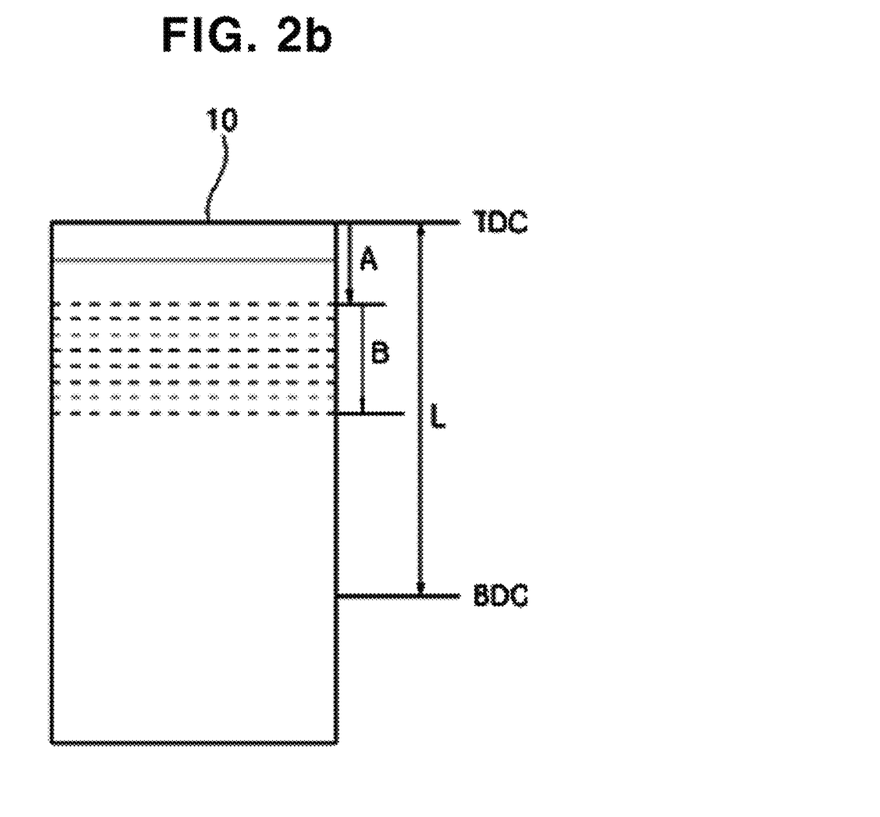
FIG. 2b is a schematic view for explaining a position where fine uneven patterns are formed on an inner wall of the cylinder.

The top dead center (TDC) refers to a position of a piston head portion when the piston is raised to the highest point while being moved in the cylinder, and the bottom dead center (BDC) refers to a position of the piston head portion when the piston is lowered to the lowest point while being moved in the cylinder. In addition, the stroke length refers to a section in which the piston head portion is moved in the cylinder, and refers to a section between the top dead center and the bottom dead center. In FIGS. 1, 2a and 2b, the top dead center of the cylinder is indicated by "TDC", the bottom dead center of the cylinder is indicated by "BDC", and the stroke length is a section which is indicated by "L" and positioned between the top dead center and the bottom dead center.

An aspect of the present disclosure relates to the cylinder which guides the movement of the piston inserted into the cylinder, and provides the cylinder having an inner wall on which a plurality of uneven patterns is formed, the plurality of uneven patterns being formed in at least a part of a region of a length region that is 5 to 50% of a stroke length section of the piston from the top dead center (TDC).

In an aspect of the present disclosure, the length region that is 5 to 50% of the stroke length section of the cylinder from the top dead center (TDC) is referred to as a first region 100 (see FIG. 2*a*).

The uneven patterns may be formed over the entire first region, and formed in a part of the first region. No matter whether the uneven patterns are formed over the entire first region or on a part of the first region, the uneven patterns may be formed at uniform intervals in a region where the uneven patterns are formed. It is advantageous in a manufacturing process that the uneven patterns are formed at uniform intervals.

According to an aspect of the present disclosure, the plurality of uneven patterns may be formed in a region that is at least 30% or more of the length region (first region 100), which is 5 to 50% of the stroke length of the piston from the top dead center (TDC). That is, the uneven patterns may be formed on the inner wall of the cylinder so that the uneven patterns are distributed in a region that is at least 30% or more of the first region 100.

According to another aspect of the present disclosure, the plurality of uneven patterns may be formed in at least a part of a region of a length region that is 8 to 32% of the stroke length of the piston from the top dead center (TDC). In the present disclosure, the length region is 8 to 32% of the stroke length of the cylinder from the top dead center (TDC), which is referred to as a second region 200 (see FIG. 2*a*).

The uneven patterns may be formed over the entire second region, and formed in a part of the second region. No matter whether the uneven patterns are formed over the entire second region or on a part of the second region, the uneven patterns may be formed at uniform intervals in a region where the uneven patterns are formed. It is advantageous in a manufacturing process that the uneven patterns are formed at uniform intervals.

According to an aspect of the present disclosure, the plurality of uneven patterns may be formed in a region that is at least 30% or more of a length region (second region 200), which is of 8 to 32% of the stroke length of the piston from the top dead center (TDC). That is, the uneven patterns may be formed on the inner wall of the cylinder so that the uneven patterns are distributed in a region that is at least 30% or more of the second region 200.

If the number of uneven patterns formed on the inner wall of the cylinder is too small, a sufficient lubrication effect may not be implemented because the number of lubricant collecting spaces is decreased, and in addition, if the number of uneven patterns formed on the inner wall of the cylinder is too large, an area of a portion where no uneven pattern is formed, that is, a portion where friction is produced with the piston ring, becomes excessively small such that surface pressure at the friction portion is increased, and as a result, frictional characteristics may deteriorate.

In an aspect of the present disclosure, there is no particular limitation to a shape of the uneven pattern. As long as the uneven pattern has a shape concavely formed to be capable of collecting lubricant, any shape is possible as a shape of the uneven pattern. However, if a shape of the uneven pattern is not appropriate, an effect of reducing friction may not be high.

A gist of a technology of reducing friction and abrasion using the surface fine uneven pattern is to determine a shape and an arrangement method of the uneven patterns so that friction and abrasion are minimized.

However, because a shape and an arrangement method of the uneven patterns, which allow friction and abrasion to be minimized, are greatly influenced by a driving condition such as a contact type of two surfaces, a load, a sliding velocity, or the like, it is not simple to determine the requirements. For example, when a shape of a contact portion is a line shape, a point shape, or a surface shape, a shape and an arrangement method of the uneven patterns, which allow friction and abrasion to be minimized, are varied, respectively. Therefore, in order to develop a technology of forming the surface uneven patterns in order to reduce friction and abrasion, it is necessary to preferentially confirm and define an operational environment or a driving condition, and an optimum shape and an optimum arrangement of the uneven patterns under the determined operational environment or driving condition need to be developed.

Meanwhile, the processing of the fine uneven patterns on the inner surface of the cylinder may cause an increase in fuel consumption or engine oil consumption. In order to prevent the above-mentioned problem, the uneven patterns need to be formed in an optimum region. An aspect of the present disclosure presents an optimum region for processing the uneven patterns and suggests an optimum shape of the uneven pattern for improving abrasion so that abrasion of the piston ring may be reduced without increasing fuel and oil consumption.

Figure 4:
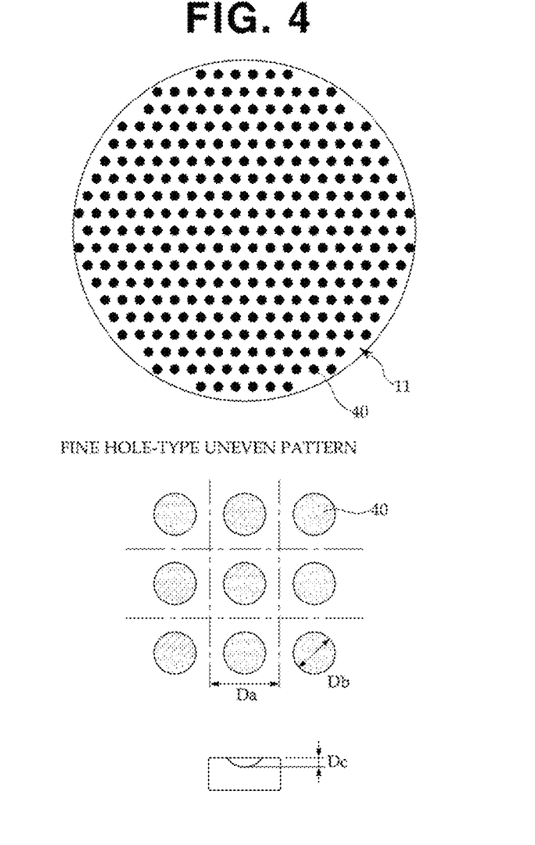
FIG. 4 is a view embodying aspects of fine hole-type uneven patterns, which are formed on the inner wall of the cylinder, in which a size and a design variable of the fine hole-type uneven pattern are illustrated.

According to an aspect of the present disclosure, a shape of the uneven pattern may be a fine hole having a concave mirror shape (see FIG. 4). Depths and density of the uneven patterns may be varied in accordance with a size of the cylinder and a type of use for the cylinder.

According to an aspect of the present invention, the fine hole having the concave mirror shape may have a depth of 0.01 to 0.03 mm, and a diameter of 0.07 to 0.17 mm. In this case, a ratio of an area purely occupied by the fine holes having the concave mirror shape to an overall area of a region where the fine holes having the concave mirror shape are formed may be 5 to 15%. Hereinafter, the area ratio will be referred to as "density".

Referring to FIG. 4, the density, which is a ratio of an area purely occupied by the fine holes having the concave mirror shape to an overall area of a region where the fine holes having the concave mirror shape are formed, may be calculated using the following Equation 1.

$$\text{Pure area ratio of fine holes(density)} = [\pi \times (Db/2)^2]/(Da)^2 \qquad \text{[Equation 1]}$$

Figure 6:
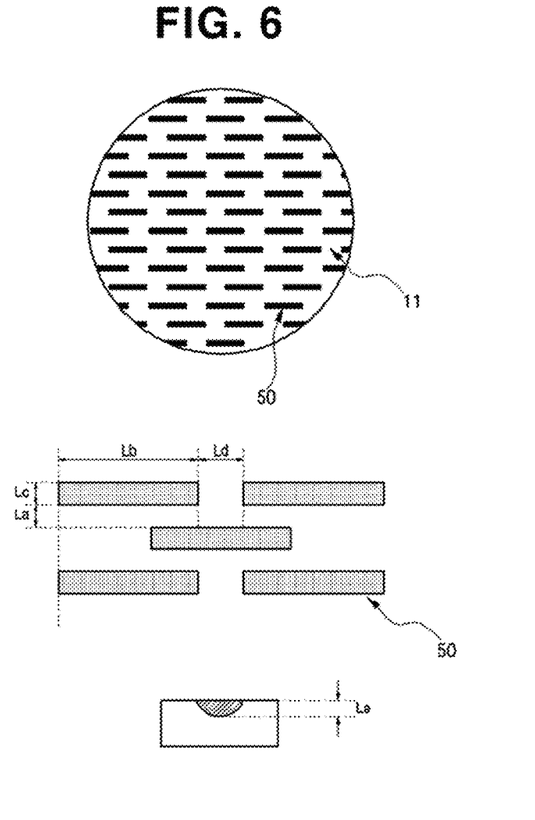
FIG. 6 is a view embodying an aspect of the dashed line groove-type uneven pattern formed on the inner wall of the cylinder, in which a size and a design variable of the dashed line groove-type uneven pattern are illustrated.

According to another aspect of the present invention, a type of uneven pattern may be represented by a dashed line groove type (see FIG. 6).

According to the aspect of the present invention, the dashed line groove-type uneven pattern may have a depth of 0.01 to 0.03 mm, and a line width of 0.08 to 0.18 mm.

A length of the dashed line groove-type uneven pattern and an interval between the uneven patterns may be variously varied in accordance with the density of the uneven patterns. According to an aspect of the present disclosure, a ratio of an area purely occupied by the dashed line groove-type uneven patterns to an overall area of a region where the dashed line groove-type uneven patterns are formed and distributed may be 8 to 18%.

Referring to FIG. 6, the density, which is a ratio of an area purely occupied by the dashed line groove-type uneven patterns to an overall area of a region where the dashed line groove-type uneven patterns are formed, may be calculated using the following Equation 2.

Pure area ratio of dashed line groove-type uneven patterns(density)=$(Lc \times Lb)/\{(La+Lc) \times (Lb+Ld)\}$ [Equation 2]

According to an aspect of the present disclosure, a length of the dashed line groove and an interval between the dashed line grooves may be variables of the density. Of course, other elements may be variables of the density.

According to an aspect of the present disclosure, uneven patterns are formed on an upper portion of an inner wall of a cylinder such that abrasive particles, which accelerate abrasion, are trapped, lubricant is supplied in a situation in which lubricant is insufficient, and oil film pressure between a piston ring and the inner wall of the cylinder is increased, thereby reducing abrasion of the cylinder and a piston or the piston ring.

Particularly, in a case in which the uneven patterns are formed in a region that is 8 to 32% of a stroke length of the inner wall of the cylinder from a top dead center, an effect of reducing abrasion of the cylinder and the piston or the piston ring is excellent.

The fine hole-type uneven pattern having a concave mirror shape according to an example of the present disclosure is easily processed, and has an excellent effect of trapping abrasive particles, supplying lubricant, and increasing oil film pressure. Particularly, when the fine hole-type uneven pattern having the concave mirror shape has a depth of 0.01 to 0.03 mm, a diameter of 0.07 to 0.17 mm, and density of 5 to 15%, an effect of trapping abrasive particles, supplying lubricant, and increasing oil film pressure is excellent.

The dashed line groove-type uneven pattern is also easily processed, and has an excellent effect of trapping abrasive particles, supplying lubricant, and increasing oil film pressure. Particularly, when the dashed line groove-type uneven pattern has a depth of 0.01 to 0.03 mm, a line width of 0.08 to 0.18 mm, and density of 8 to 18%, an effect of trapping abrasive particles, supplying lubricant, and increasing oil film pressure is excellent.

According to an aspect of the present disclosure, by improving a lubrication state between the piston ring and a cylinder bore, which are relatively moved with each other in an internal combustion engine, abrasion of the piston ring may be reduced by 70% or more.

DESCRIPTION OF MAIN REFERENCE NUMERALS OF DRAWINGS

10: Cylinder
11: Inner wall of cylinder
40: Fine hole-type uneven pattern having concave mirror shape
50: Dashed line groove-type uneven pattern
TDC: Top dead center
BDC: Bottom dead center
L: Stroke length

DETAILED DESCRIPTION

Hereinafter, the present disclosure will be described in more detail with reference to the Examples and drawings.

Examples 1 to 10

In an aspect of the present disclosure, in order to confirm a region inside a cylinder where an effect of reducing abrasion of the cylinder and a piston ring may be maximized by forming a plurality of uneven patterns (fine uneven patterns), first, abrasion states of an inner wall of the cylinder, which has been actually used, were measured. Based on lengths measured from a lower end portion of the cylinder, the abrasion states were measured for each length and illustrated in FIG. 3.

Figure 3:
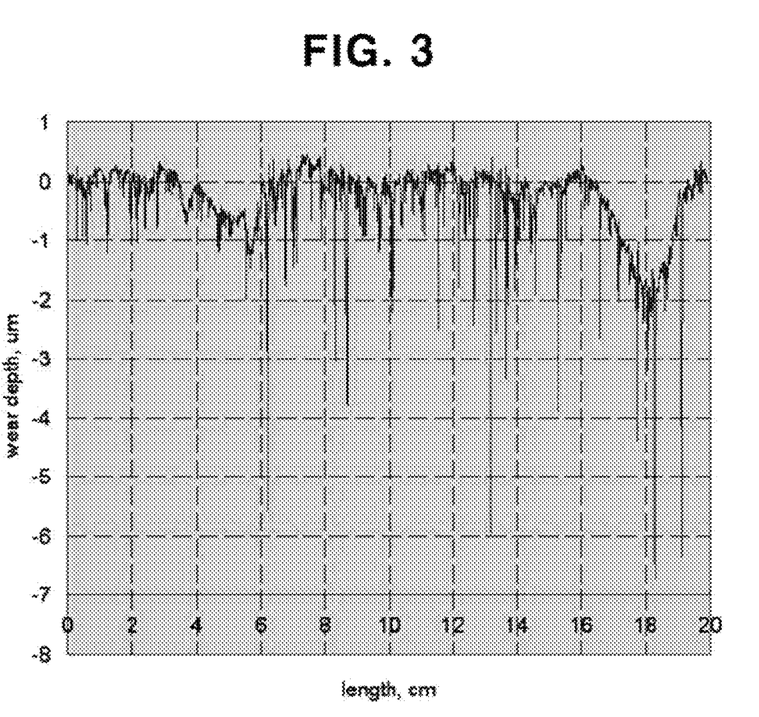
FIG. 3 is a graph illustrating abrasion distribution on the inner wall of the cylinder which is applied to Examples 1 to 10.

In FIG. 3, the length refers to a length going up from the lower end portion of the cylinder to an upper end. A stroke length of the cylinder is 12.6 cm, a top dead center is at a point of 20 cm, and a bottom dead center is at a point of 7.4 cm.

Referring to FIG. 3, it may be known that the largest amount of abrasion occurs at a region of 16 to 19 cm. If the abrasion region of FIG. 3 is marked with A and B of FIG. 2, A=1 cm and B=4 cm, and because the stroke length L of this cylinder is 12.6 cm, A/L=0.08 and B/L=0.32. Therefore, the cylinder of the present example may be called a cylinder in which the largest amount of abrasion occurs in a region that is 8 to 32% of the stroke length from the top dead center.

In order to confirm an effect of improving abrasion of the piston ring and the cylinder by forming fine hole-type uneven patterns having a concave mirror shape according to an aspect of the present disclosure on the inner wall of the cylinder, an abrasion test was performed as follows.

The abrasion test was performed after forming the fine hole-type uneven patterns having the concave mirror shape, which are illustrated in FIG. 4, in the cylinder, as illustrated in the following Table 1. Here, a diameter, a depth, and density of the fine hole-type uneven pattern having the concave mirror shape are set to be design variables, and here, the diameter is Db, a depth is Dc, and the density of the uneven patterns may be obtained from Equation 1.

TABLE 1

| Division | Design Value | | | Measured Value After Manufactured | | |
|---|---|---|---|---|---|---|
| | Line Width (μm) | Depth (μm) | Density (%) | Line Width (μm) | Depth (μm) | Density (%) |
| Example 1 | 100 | 12 | 6 | 108 | 13.5 | 7.9 |
| Example 2 | 100 | 20 | 16 | 101 | 20.5 | 15.9 |
| Example 3 | 100 | 30 | 23 | 95 | 31.2 | 20.2 |
| Example 4 | 150 | 12 | 6 | 142 | 14.6 | 5.8 |
| Example 5 | 150 | 20 | 16 | 150 | 21.9 | 15.7 |
| Example 6 | 150 | 30 | 23 | 163 | 31.4 | 27.5 |
| Example 7 | 190 | 12 | 6 | 181 | 12.3 | 5.2 |
| Example 8 | 190 | 20 | 16 | 197 | 20.9 | 15.3 |
| Example 9 | 190 | 30 | 23 | 196 | 31.4 | 23.3 |

Based on the test result of Table 1, Examples 1 and 5 having an excellent effect of reducing abrasion are chosen. In addition, a shape of an uneven pattern corresponding to a medium size of Examples 1 and 5 was additionally implemented, set as Example 10, and designed as illustrated in the following Table 2. Abrasion tests for each of the Examples were performed five times, and the results are illustrated in FIG. 5.

TABLE 2

| Division | Design Value | | | Measured Value After Manufactured | | |
|---|---|---|---|---|---|---|
| | Line Width (μm) | Depth (μm) | Density (%) | Line Width (μm) | Depth (μm) | Density (%) |
| Example 1 | 100 | 12 | 6 | 103 | 13.2 | 7.9 |
| Example 10 | 120 | 20 | 10 | 120 | 22.5 | 10.0 |
| Example 5 | 150 | 20 | 16 | 148 | 20.9 | 16.7 |

Figure 5:
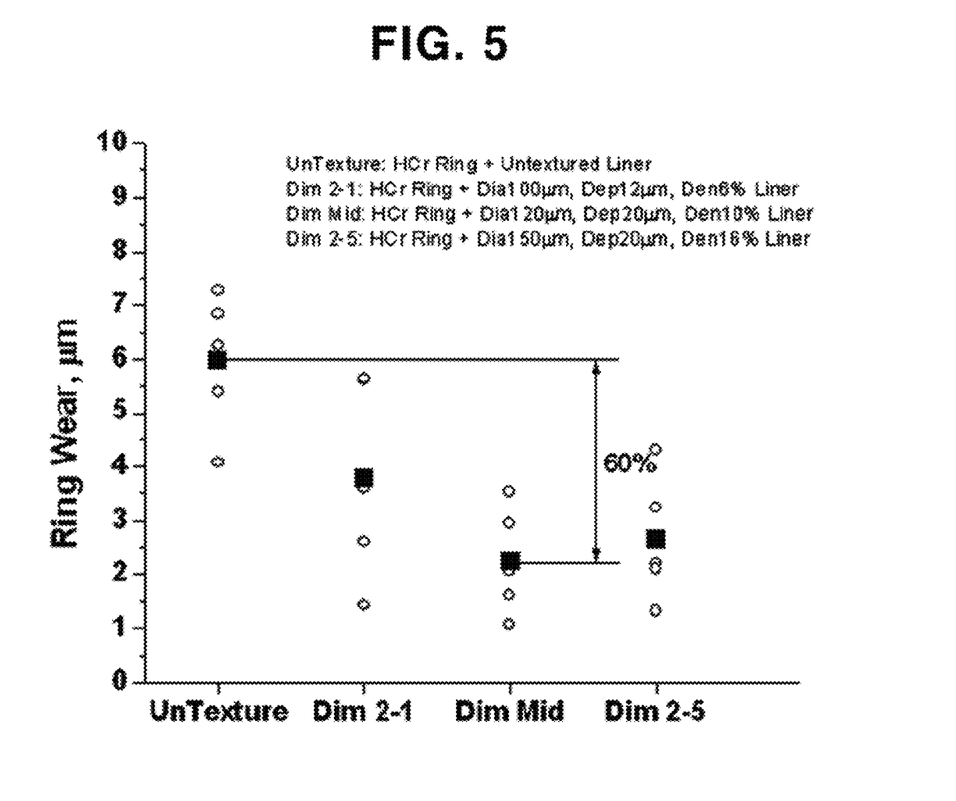
FIG. 5 is a graph illustrating abrasion of the piston ring in a case in which an abrasion test is performed after forming the fine hole-type uneven patterns illustrated in FIG. 4 on the inner wall of the cylinder.

In FIG. 5, "UnTexture" refers to an abrasion amount of the piston ring in the cylinder where the uneven patterns are not formed, and Dim 2-1, 2 Mid, and Dim 2-5 refer to abrasion amounts of the piston ring in the cylinders where the uneven patterns according to Example 1, Example 10, and Example 5 of Table 2 are formed, respectively.

As illustrated in FIG. 5, in a case of Example 10, an abrasion amount of the piston ring was reduced to a level by 40% compared to an abrasion amount in a case in which the uneven patterns were not formed (UnTexture). That is, it was confirmed that when the fine hole-type uneven patterns having the concave mirror shape, a diameter of 0.12 mm, a depth of 0.02 mm, and density of 10% are processed on the inner wall of the cylinder in a region that is 8 to 32% of the stroke length from the top dead center, abrasion of the piston ring may be reduced by about 60%.

Examples 11 to 20

In order to confirm an effect of improving abrasion of the piston ring in a case in which dashed line groove-type uneven patterns according to the present disclosure are formed on the inner wall of the cylinder, an abrasion test was performed as follows.

The abrasion test was performed after forming the dashed line groove-type uneven patterns, which are illustrated in FIG. 6, in the cylinder, as illustrated in the following Table 3. Here, a line width, a depth, and density of the dashed line groove-type uneven pattern are set to be design variables, and here, the line width is Lc, the depth is Le, and the density may be obtained from Equation 2.

TABLE 3

| Division | Design Value | | | Measured Value After Manufactured | | |
|---|---|---|---|---|---|---|
| | Line Width (μm) | Depth (μm) | Density (%) | Line Width (μm) | Depth (μm) | Density (%) |
| Example 11 | 100 | 10 | 5 | 87 | 10.0 | 4.4 |
| Example 12 | 100 | 20 | 13 | 105 | 17.9 | 13.8 |
| Example 13 | 100 | 30 | 21 | 107 | 31.5 | 22.6 |
| Example 14 | 135 | 10 | 5 | 137 | 13.2 | 13.3 |
| Example 15 | 135 | 20 | 13 | 127 | 24.2 | 19.9 |
| Example 16 | 135 | 30 | 21 | 132 | 24.1 | 4.9 |
| Example 17 | 180 | 10 | 5 | 150 | 17.2 | 17.6 |
| Example 18 | 180 | 20 | 13 | 173 | 24.2 | 4.8 |
| Example 19 | 180 | 30 | 21 | 170 | 34.8 | 12.3 |

Based on the test result of Table 3, Examples 12 and 17 having an excellent effect of improving abrasion are chosen. In addition, a dashed line groove-type uneven pattern corresponding to a medium size of Examples 12 and 17 was additionally implemented, and set as Example 20. The Examples were designed as illustrated in the following Table 4, and abrasion tests for each of the Examples were performed five times. The result is illustrated in FIG. 7.

TABLE 4

| Division | Design Value | | | | Average Data of Measured Value | |
|---|---|---|---|---|---|---|
| | Line Width (μm) | Depth (μm) | Density (%) | Friction (N) | Piston Ring Abrasion (μm) | Liner Abrasion (%) |
| Example 12 | 100 | 20 | 13 | 7.13 | 1.67 | 1.95 |
| Example 17 | 180 | 10 | 21 | 7.32 | 2.02 | 2.25 |
| Example 20 | 135 | 20 | 13 | 7.19 | 1.43 | 2.11 |

Figure 7:
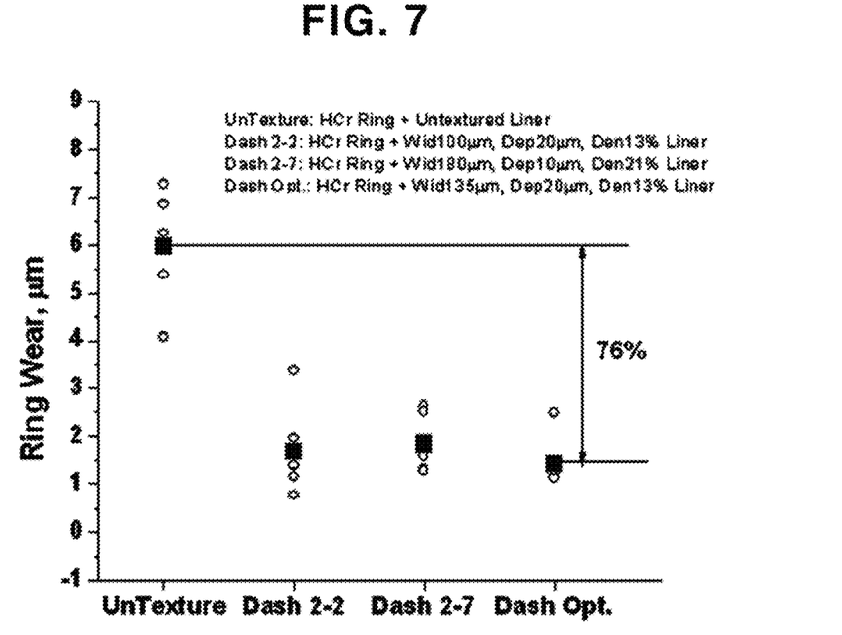
FIG. 7 is a graph illustrating abrasion of the piston ring in a case in which an abrasion test is performed after forming the dashed line groove-type uneven patterns illustrated in FIG. 6 on the inner wall of the cylinder.

In FIG. 7, "UnTexture" refers to abrasion of the piston ring in a case in which the uneven pattern is not processed, and Dash 2-2, Dash 2-7, and Dash Opt refer to abrasion of the piston ring in Examples 12, 17, and 20 of Table 4, respectively.

As illustrated in FIG. 7, an abrasion amount of the piston ring in a case in which the uneven patterns according to Example 20 are processed on the inner wall of the cylinder is a level of 24% of an abrasion amount of the piston ring in a case in which the uneven pattern is not processed. That is, it was confirmed that when the dashed line groove-type uneven patterns having a line width of 0.13 mm, a depth of 0.02 mm, and density of 13% are processed on the inner wall of the cylinder in a region that is 8 to 32% of the stroke length from the top dead center, abrasion of the piston ring may be reduced by 76%.

As described above, according to the present disclosure, by improving a lubrication state between the piston ring and the inner wall of the cylinder, which are relatively moved with each other in an internal combustion engine, abrasion of the piston ring may be reduced to 70%.

Figure 8:
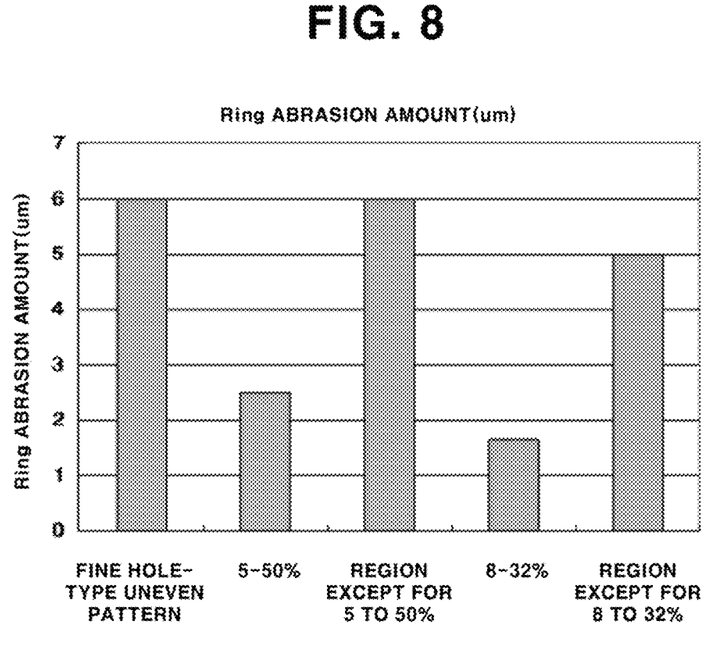
FIG. 8 is a graph for comparing an abrasion amount of the piston ring in a case in which the fine uneven patterns are formed on the inner wall of the cylinder with an abrasion amount of the piston ring in a case in which the fine uneven patterns are not formed on the inner wall of the cylinder. Here, the fine uneven patterns, which are formed on the inner wall of the cylinder, were formed in a region that is 5 to 50% of a stroke length from the top dead center, a region except for the region that is 5 to 50% of the stroke length from the top dead center, a region that is 8 to 32% of the stroke length from the top dead center, and a region except for the region that is 8 to 32% of the stroke length from the top dead center, respectively.

Meanwhile, an abrasion amount of the piston ring in a case in which the uneven patterns are formed in the cylinder applied to the present example and an abrasion amount of the piston ring in a case in which the uneven patterns are not formed are compared in FIG. 8.

Specifically, the test results are compared with respect to i) a case in which the fine uneven patterns are not formed, ii) a case in which the fine uneven patterns are formed in a region that is 5 to 50% of the stroke length from the top dead center, iii) a case in which the fine uneven patterns are formed in a region except for the region that is 5 to 50% of the stroke length from the top dead center, iv) a case in which the fine uneven patterns are formed in a region that is 8 to 32% of the stroke length of the top dead center, and v) a case in which the fine uneven patterns are formed in a region except for the region that is 8 to 32% of the stroke length of the top dead center.

Referring to FIG. 8, in a case in which the fine uneven patterns are formed in a region except for the region that is 5 to 50% of the stroke length from the top dead center, there was nearly not an effect of reducing abrasion of the piston ring, similar to a case in which the fine uneven patterns are not formed on the inner wall of the cylinder. In contrast, in a case in which the fine uneven patterns are formed in a region that is 5 to 50% of the stroke length from the top dead center and in a case in which the fine uneven patterns are formed in a region that is 8 to 32% of the stroke length from the top dead center, an effect of reducing abrasion of the piston ring was excellent compared to a case in which the fine uneven patterns are not formed on the inner wall of the cylinder. Particularly, it may be known that in a case in which the fine uneven patterns are formed in the region that is 8 to 32% of the stroke length from the top dead center, an effect of reducing abrasion of the piston ring is the most excellent.

Figure 9:
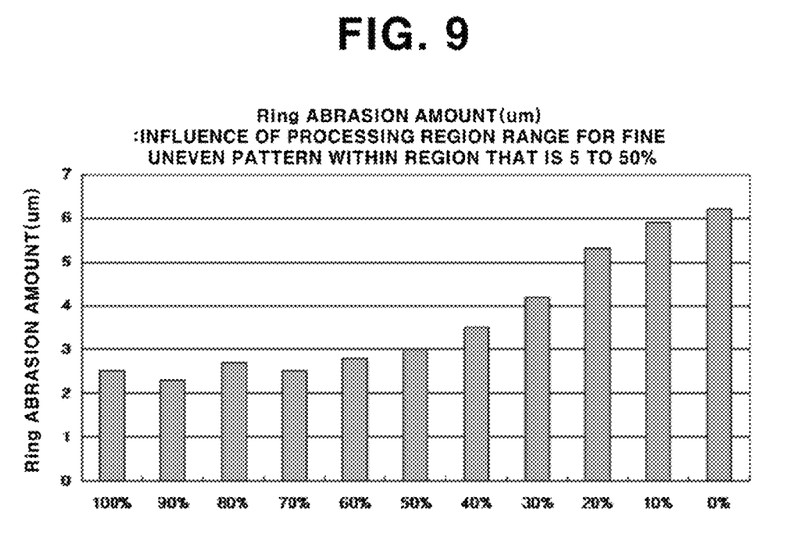
FIG. 9 is a graph for comparing abrasion amounts for each area ratio of portions where the uneven patterns are formed in the region that is 5 to 50% of the stroke length of the inner wall of the cylinder from the top dead center.

In addition, in a case in which the fine uneven patterns are formed on the inner wall of the cylinder in accordance with the present exemplary embodiment, and the fine uneven patterns are formed in a part of the region that is 5 to 50% of the stroke length from the top dead center, abrasion amounts of the piston ring for each ratio of areas where the fine uneven patterns are formed are compared, and the test result is illustrated in FIG. 9. That is, FIG. 9 may be the test result with respect to what percentage of the region that is 5 to 50% of the stroke length from the top dead center is a region where a fine processing needs to be performed. Here, a case in which the uneven patterns are formed in the overall region that is 5 to 50% of the stroke length from the top dead center was marked with 100%, and a case in which fine uneven pattern are not formed was marked with 0%. In addition, after forming fine uneven patterns even in 10% region, 20% region, 30% region, 40% region, 50% region, 60% region, 70% region, 80% region, and 90% region sequentially from an upper end of the region that is 5 to 50% of the stroke length from the top dead center, abrasion amounts of the piston ring were measured.

According to the test result, it was confirmed that in a case in which the uneven patterns are formed in a region that is at least 30% or more of the region (first region 100), which is 5 to 50% of the stroke length from the top dead center, an excellent effect of improving abrasion of the piston ring may be implemented (see FIG. 9).

Figure 10:
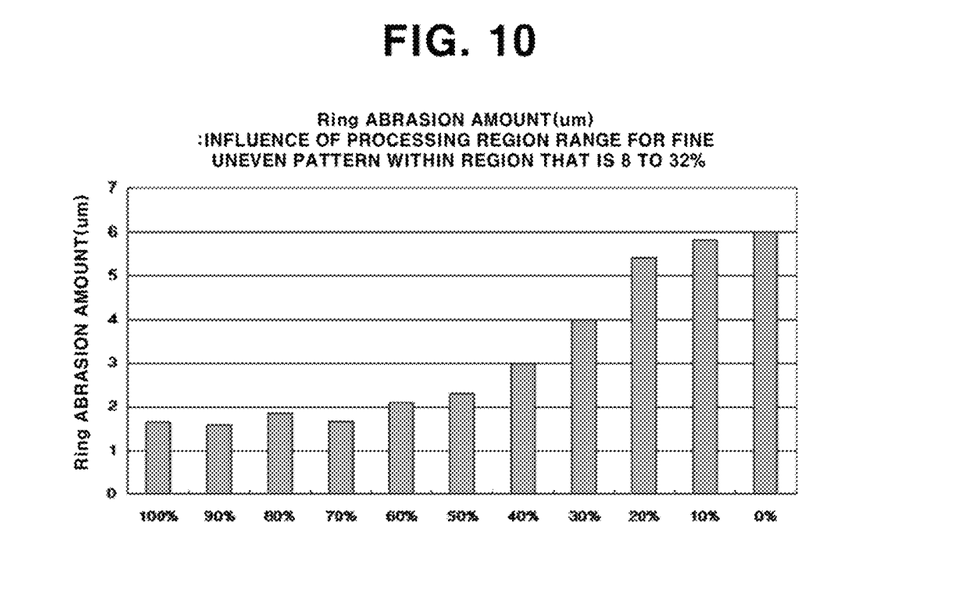
FIG. 10 is a graph for comparing abrasion amounts for each area ratio of portions where the uneven patterns are formed in the region that is 8 to 32% of the stroke length of the inner wall of the cylinder from the top dead center.

In addition, in a case in which the fine uneven patterns are formed on the inner wall of the cylinder in accordance with the present disclosure, and the uneven patterns are partially formed in the region that is 8 to 32% of the stroke length from the top dead center, abrasion amounts of the piston ring for each ratio of areas where the uneven patterns are formed are compared and illustrated in FIG. 10. That is, FIG. 10 may be the test result with respect to what percentage of the region that is 8 to 32% of the stroke length from the top dead center is a region where a fine processing needs to be performed. Here, a case in which the uneven patterns are formed in the overall region that is 8 to 32% of the stroke length from the top dead center was marked with 100%, and a case in which fine uneven patterns are not formed was marked with 0%. In addition, after forming fine uneven patterns even in 10% region, 20% region, 30% region, 40% region, 50% region, 60% region, 70% region, 80% region, and 90% region sequentially from an upper end of the region that is 8 to 32% of the stroke length from the top dead center, abrasion amounts of the piston ring were measured.

According to the test result, it was confirmed that in a case in which the uneven patterns are formed in a region that is at least 30% or more of the region (second region 200), which is 8 to 32% of the stroke length from the top dead center, an excellent effect of improving abrasion of the piston ring may be implemented (see FIG. 10). That is, it was effective when the fine uneven patterns are processed in a region that is 30% or more of the region which is 8 to 32% of the region. Moreover, it could be seen that the abrasion amount of the piston ring is more reduced in a case in which the uneven patterns are formed in a region that is 30% or more of the region which is 8 to 32% of the stroke length of the top dead center than a case in which the uneven patterns are formed in a region that is 30% or more of the region which is 5 to 50% of the stroke length of the top dead center.

An aspect of the present disclosure may be applied to various types of cylinders, and particularly, applied to a cylinder of an internal combustion engine.

Although the present disclosure has been described with reference to exemplary and preferred embodiments, workers skilled in the art will recognize that changes may be made in form and detail without departing from the spirit and scope of the disclosure.

The invention claimed is:

1. A cylinder which is configured to guide movement of a piston, the cylinder comprising:
   a plurality of uneven patterns formed on the inner wall of the cylinder,
   wherein the plurality of uneven patterns are only formed in at least a part of a length region that is 5 to 50% of a stroke length section of the piston from a top dead center (TDC).

2. A cylinder of claim 1, wherein the plurality of uneven patterns are only formed in at least 30% or more of the length region which is 8 to 32% of the stroke length section of the piston from the top dead center (TDC).

3. The cylinder of claim 1, wherein the plurality of uneven patterns includes a fine hole having a concave mirror shape.

4. The cylinder of claim 3, wherein the fine hole having the concave mirror shape has a depth of 0.01 to 0.03 mm, and a diameter of 0.07 to 0.17 mm.

5. The cylinder of claim 4, wherein a density of an area purely occupied by the fine hole and similar fine holes having the concave mirror shape to an overall area where the fine holes having the concave mirror shape are formed is 5 to 15%.

6. The cylinder of claim 1, wherein the plurality of uneven patterns includes a dashed line groove-type uneven pattern.

7. The cylinder of claim 6, wherein the dashed line groove-type uneven pattern has a depth of 0.01 to 0.03 mm, and a line width of 0.08 to 0.18 mm.

8. The cylinder of claim 7, wherein a density of an area purely occupied by the plurality of uneven patterns to an overall area of a region where the plurality of uneven patterns is formed is 8 to 18%.

9. A cylinder which is configured to guide movement of a piston, the cylinder comprising:
   an inner wall; and
   a plurality of uneven patterns formed on the inner wall,
      wherein the plurality of uneven patterns are only formed in at least 30% or more of a length region, and
      wherein the length region is 8 to 32% of a stroke length section of the piston from a top dead center (TDC).

* * * * *